Feb. 1, 1938.  R. R. DAUWALTER  2,107,068
PERFORATING MACHINE
Filed Dec. 31, 1936  3 Sheets-Sheet 1

INVENTOR
Raymond R. Dauwalter
BY
ATTORNEY

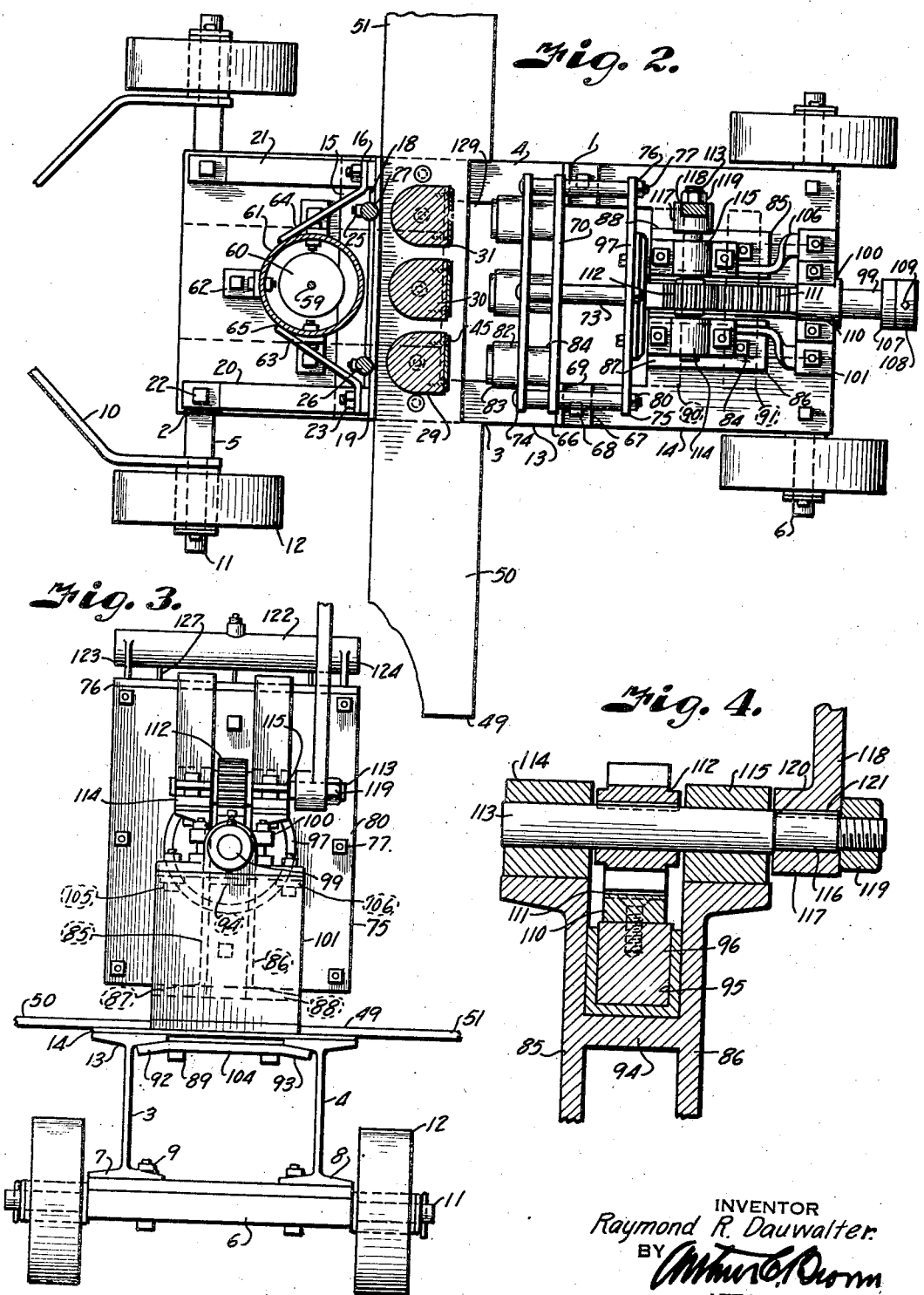

Feb. 1, 1938.    R. R. DAUWALTER    2,107,068
PERFORATING MACHINE
Filed Dec. 31, 1936    3 Sheets-Sheet 3
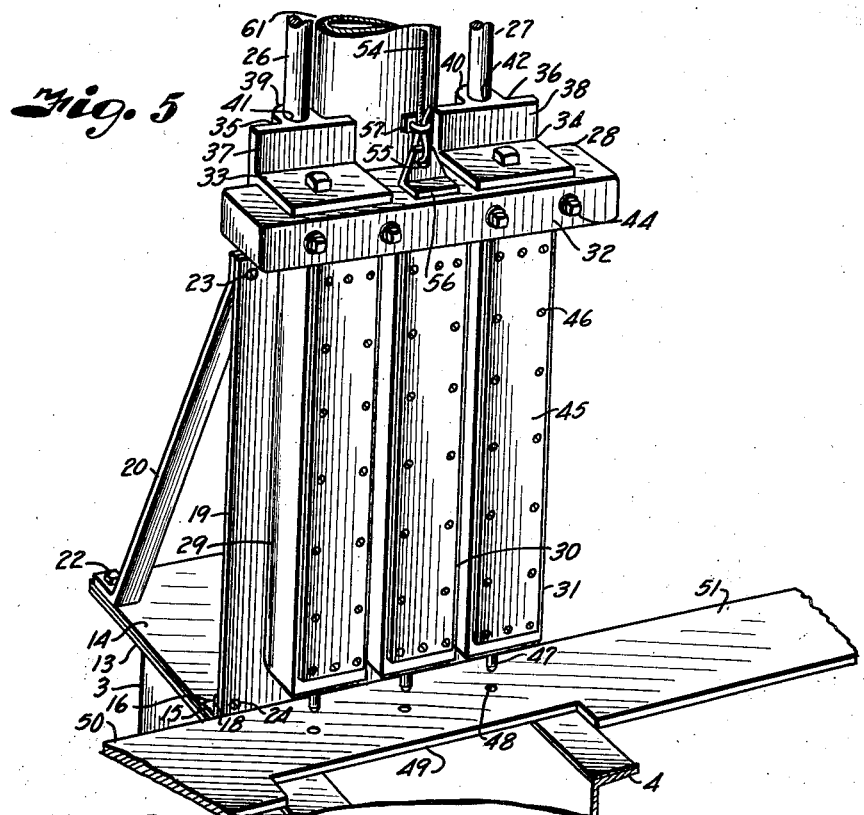
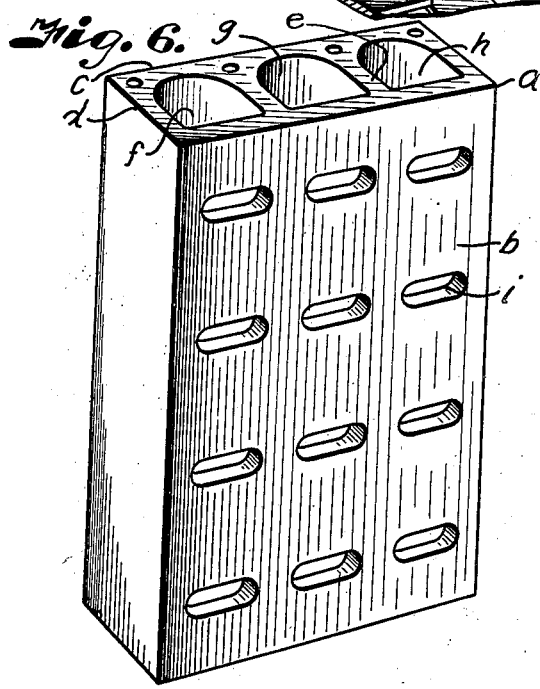
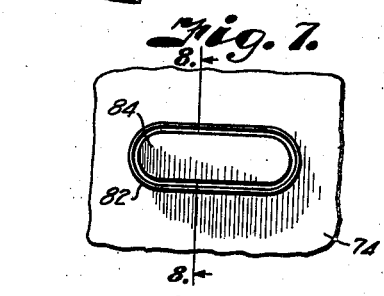
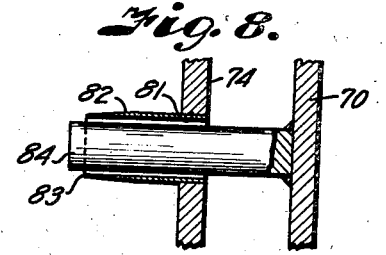
INVENTOR
Raymond R. Dauwalter
BY
ATTORNEY Patented Feb. 1, 1938

2,107,068

UNITED STATES PATENT OFFICE 2,107,068

PERFORATING MACHINE

Raymond R. Dauwalter, Birmingham, Ala., assignor to W. S. Dickey Clay Manufacturing Company, Kansas City, Mo., a corporation of Delaware Application December 31, 1936, Serial No. 118,503

12 Claims. (Cl. 25—105)

This invention relates to a perforating machine, particularly for use in slotting drain tiles, and has for its principal object to provide a machine of this character equipped with cutters whereby the tiles are cleanly cut without deformation or tearing; to provide a machine with a gang of cutters whereby all of the slots may be produced through a single operation of the machine; to provide automatic removal of the material cut from the tiles and dislodgment thereof from the cutters; and to provide means for lubricating the cutters to facilitate the cutting action thereof.

In accomplishing these and other objects of the invention, as hereinafter pointed out, improved details of structure have been provided, the preferred form of which is illustrated in the accompanying drawings, wherein:

Fig. 2 is a horizontal section through the machine on the line 2—2 of Fig. 1.

Fig. 3 is an end elevational view of the machine.

Fig. 4 is a detail section through the cutter actuating gearing on the line 4—4 of Fig. 1.

Fig. 5 is a detail perspective view of a portion of a machine particularly illustrating the mandrels for centering a tile relatively to the cutters.

Fig. 6 is a detail perspective view of one of the tiles.

Fig. 7 is a detail elevational view of the cutting end of one of the cutters and its associated plunger.

Fig. 8 is a section through the cutter on the line 8—8, Fig. 7, with the plunger shown in elevation.

Figure 1:
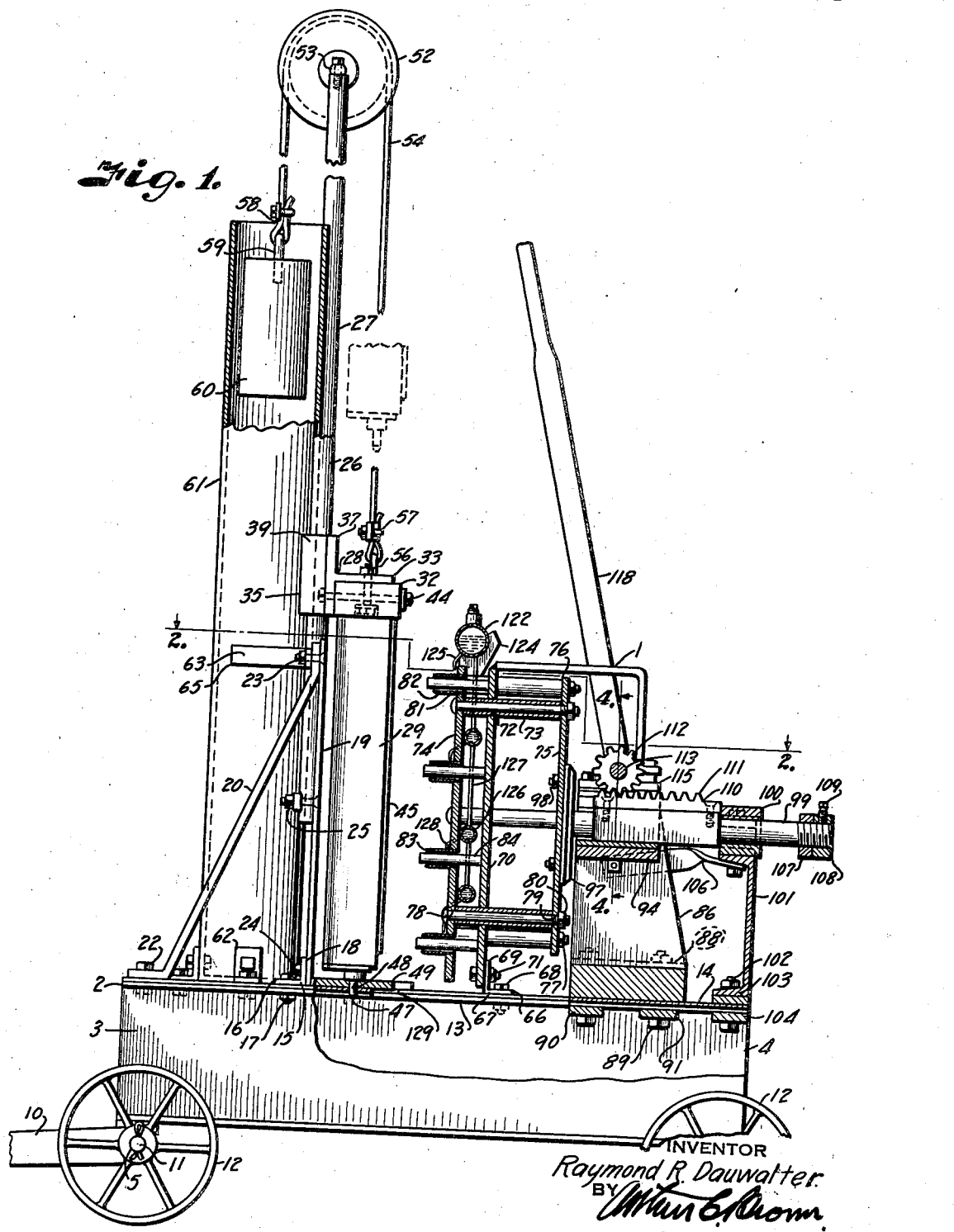
Fig. 1 is a side elevational view of a perforating machine constructed in accordance with the present invention, parts of which are shown in section to better illustrate the construction.

Referring more in detail to the drawings:

1 designates a machine embodying the features of the present invention and which includes a truck 2 consisting of spaced sills 3 and 4 having their ends supported on front and rear axles 5 and 6. In the illustrated instance the sills are I-beams and have their lower flanges 7 and 8 rigidly secured to the rear axle 6 by suitable fastening devices 9, as best shown in Fig. 3. The front axle 5 is preferably pivotally connected with the forward ends of the sills whereby the axle may be turned relatively to the frame under the influence of a propelling tongue 10. The ends of the axles 5 and 6 are provided with spindles 11 whereon wheels 12 are rotatably supported. The front axle 5 is longer than the width of the frame so as to provide ample turning radius of the front wheels when steering the truck from one place of use to another. Carried upon the upper flanges 13 of the sills is a plate 14 forming a bed or platform upon which the operating mechanisms of the machine are supported, as now to be described.

The machine illustrated is particularly designed for use in perforating drain tiles of a type illustrated in Fig. 6, which shows a tile including a substantially rectangular shaped block "a" having side walls "b" and "c" connected by side and intermediate webs "d" and "e" to form longitudinal ducts or channels "f", "g" and "h" and into which liquid drains through perforations "i" within the face "b" of the tile. The perforations "i" are in the form of rectangular slots having parallel side faces connected by semicircular end faces as clearly shown in the drawings. The slots are shown as arranged in spaced rows extending along the length of the tile with the slots of the respective rows aligning with the respective drain channels "f", "g" and "h". In the illustrated instance, the upper portions of the drain channels extend in parallel relation with the outer surface of the tile but the lower portions are rounded and of substantially semicircular cross-section.

While one form of tile has been particularly described, it is to be understood that the drain tile may be of various designs and have perforations varying in shape, size and arrangement, and that the perforations are to be produced with an embodiment of the present invention, however, to produce the different tiles it is, of course, necessary to provide the machine with correspondingly shaped cutters and mandrels for centering and backing the tile while the perforations are being formed therein as later described.

Extending transversely across the platform at a point spaced rearwardly from the forward end of the sills 3 and 4, is an angle bar 15 having one flange 16 secured to the plate 14 by fastening devices 17 and its other flange 18 extending vertically to anchor the lower end of a plate 19 arranged on edge, transversely of the truck, and which has its upper end braced in vertical position by bars 20 and 21 secured to the upper side corners of the plate by fastening devices, such as bolts 22 and to the forward edge of the platform directly over the ends of the sills by similar fastening devices 23. The lower end of the plate is shown as secured to the flange 18 by bolts 24 extending through the plate and through the flange of the angle. The bolts 22 and 24 preferably have their heads countersunk within the rear face of the plate so as not to interfere with placement of the tiles as later described.

Fixed to the forward side of the plate by fastening devices 25 are spaced, vertical guides 26 and 27 providing a track for a carriage 28 suspending mandrels 29, 30 and 31. The carriage 28 includes a cross head 32 that is connected with flanges 33 and 34 of guides 35 and 36. The guides 35 and 36 include plate portions 37 and 38 connected with the flanges 33 and 34 and carry tubular bosses 39 and 40 provided with vertical bores 41 and 42 to receive the vertical guides. The cross bar is attached to the flanges 33 and 34 by fastening devices such as bolts 44 extending through openings in the flanges and through aligning openings in the bar as best illustrated in Fig. 1.

The mandrels 29, 30 and 31 are spaced apart and conform in cross-section to the cross-section of the channels "f", "g" and "h" of the tile so that they closely engage the walls of the channels to center the tile with the face side "b" thereof in contact with abutment plates 45 secured to the flat faces of the mandrels by screws 46 having their heads countersunk in the plates to provide a smooth surface against which the cutters contact when projected through the green material composing a tile just after it has been removed from a forming press. The mandrels are retained in fixed position relatively to the cutters by means of dowels 47 projecting from the lower ends of the mandrels and adapted to engage in openings 48 of a tile supporting plate 49 that is supported transversely of the platform plate and has its ends 50 and 51 projecting laterally therefrom as best illustrated in Figs. 2, 3 and 5.

The carriage, including the mandrels, is reciprocably mounted on the guides so that the mandrels can be lowered into the channels of a tile preparatory to perforation, and retracted therefrom to permit removal of the perforated tile. This is accomplished by providing an elevating and lowering mechanism including a groove pulley 52 that is rotatably mounted on a cross bar 53 having its ends secured to the upper ends of the guides 26 and 27. Operating in the groove of the pulley is a cable 54 having one end passed through an eye opening 55 that is provided in a clip 56 attached to the cross bar 32 of the carriage. The end of the cable after passing through the eye is doubled back upon itself and clamped by a U-clamp 57 as best shown in Fig. 5. The other end of the cable is secured by a similar connection 58 with the eye 59 of a counterbalance weight 60 wherewith the combined weight of the carriage and mandrels is balanced to facilitate movement thereof on the guides.

The counterbalance weight 60 is operable in a tubular housing 61 having its lower end supported on the platform plate and projecting upwardly on the forward side of the plate 19, as best shown in Fig. 1. The lower end of the housing is secured to the platform plate by angle clips 62 having one of their flanges secured to the platform and their other flanges secured to the housing. The tubular housing is also braced from the upper portion of the plate 19 by bars 63 and 64 having foot portions secured to the brackets 20 and 21 by the fastening devices 23, previously mentioned. The other ends of the bars are secured tangentially of the housing by welding or the like as shown at 65, Fig. 2.

Spaced from the angle bar 15 toward the rear end of the platform plate is a similar angle bar 66 having one flange 67 secured thereto by fastening devices 68 and its other flange 69 forming an attachment for a transverse plate 70 that extends in rearwardly spaced, parallel relation with the plate 19, the lower edge of the plate 70 being secured to the flange of the angle by fastening devices 71. Reciprocable within bearing openings 72 formed in the plate 70 are sleeves 73 spacing plates 74 and 75 of a knife carrying frame 76. The plates 74 and 75 are secured together by bolts 77 extending through openings 78 in the forward plate through the spacing sleeves and through aligning openings 79 in the rear plate 75 as best shown in Fig. 1. The shanks of the bolts are of sufficient length to project from the plate 75 and are provided with nuts 80 to draw the plates firmly against the ends of the spacing sleeves.

Formed within the forward plate of the knife carrying frame are a plurality of rows of openings 81 conforming in number and spacing to the openings "i" to be produced in the tile. The openings mount tubular cutters 82 having a cross-sectional shape corresponding to the openings to be produced in a tile. The cutters project from the plate and have sharpened peripheral forward edges 83. The tubular cutters are also of sufficient length to project through the wall of the tile for engagement with the backing plates 45 carried by the respective mandrels.

Fixed to the plate 70 in axial alignment with the tubular cutters are plungers 84 which are of sufficient length to slightly project from the forward ends of the cutters when the cutters are in retracted position, shown in Fig. 1. The plungers are preferably shaped to conform to the inner cross-section of the cutters so that they are adapted to displace the biscuits or material from the cutters that is removed from the tiles. In order to actuate the cutter frame for moving the cutters into cutting contact with the tile, the machine illustrated is provided with a manual mechanism as now to be described.

Carried upon the platform plate are spaced bearing brackets 85 and 86 having foot flanges 87 and 88 rigidly attached to the platform by fastening devices such as bolts 89 projecting through suitable openings in the platform and through openings in clamping bars 90 and 91 positioned under the platform and having their ends 92 and 93 engaging the upper flanges of the sills 3 and 4, as shown in Fig. 3. The bearing brackets are connected by a cross web 94 to provide a guideway 95 slidably retaining a rack bar 96. The rack bar 96 has a head 97 attached to its forward end which in turn is connected with the rear plate 70 of a cutter frame by fastening devices 98. The rear end of the rack bar carries a stem 99 that is slidably mounted in a bearing 100 carried on a bracket 101 that is secured to the platform by fastening devices 102 extending through aligning openings in a foot flange 103 of the bracket, through openings in the platform, and through aligning openings in a clamp bar 104 similar to the clamp bars 90 and 91, previously described. The bracket 101 is also braced from the bearing brackets 85 and 86 by tie bars 105 and 106 as shown in Figs. 1 and 2. The rear end of the stem 99 is threaded to mount a stop collar 107 and a locking collar 108 that is retained against rotation on the stem by a set screw 109.

Mounted on the rack bar is a rack 110 having teeth 111 meshing with a pinion gear 112 carried on a shaft 113 having its ends rotatably mounted in bearings 114 and 115 of the bearing brackets 85 and 86. The end of the shaft projecting through the bearing 115 carries a reduced extension 116 mounting the hub 117 of an actuating lever 118. The hub of the lever is retained by a jam-nut 119 threaded on the end of the extension to urge the hub of the actuating lever against the shoulder 120 of the shaft. The hub of the actuating lever is also keyed to the shaft extension by a key 121. The lever 118 extends radially in an upward direction from the shaft and is of sufficient length to provide suitable leverage whereby the cutters may be readily moved into and out of cutting contact with the tile.

To facilitate penetration of the cutters or their clean withdrawal, they are preferably lubricated with a liquid lubricant that is carried in an oil reservoir 122 having its ends secured to brackets 123 and 124 attached to the upper edge of the plate carrying the cutters. Extending from the reservoir in line with each of the upper cutters are nozzles 125 through which lubricant material drips upon the upper set of cutters. Located above each of the lower cutters are manifolds 126 connected with the supply reservoir through conduits 127 and projecting from the manifolds are nozzles 128 extending through suitable openings in the plate and having ends projecting over the lower cutters to supply lubricant thereto.

In using a machine constructed and assembled as described, it is drawn by the tongue 10 alongside of the press on which the green tiles are formed, so that the tiles produced in the press may be lifted therefrom, placed on end upon the plate 49, and moved into a position in front of the plate 19 so that the channels "*f*", "*g*" and "*h*" therein will align with the mandrels. The mandrel carriage 28 is then caused to descend, carrying the mandrels into the channels so that the plates 45 thereof back the front side of the tile and support it against inward movement under pressure of the cutters when they are moved into cutting relation therewith. When the mandrels are in fully lowered position the dowel pins thereon are engaged in the openings of the cross plate to retain the tile against relative movement. An operator then grasps the lever 118 and swings it in a clockwise direction, Fig. 1, to cause movement of the rack in the direction of the tile thereby moving the cutter carrying frame to bring the cutters into engagement with the face "*b*" of the tile. Upon further movement of the lever 118, the cutters are caused to penetrate the tile making a cut forming the side and end faces of the apertures "*i*". The lever 119 is then rocked in reverse direction to cause retractive movement of the carriage and withdrawal of the cutters carrying therewith the material or biscuits cut from the tile. As the cutters move retractively over the plungers, the plungers displace the biscuits which fall to the floor through an opening 129 that is provided in the platform plate 14. Due to the lubrication of the cutters, they readily penetrate the walls of the green tile so as not to damage the tile as the cutters are projected therethrough, and they also withdraw cleanly without tearing the tile.

After the openings have been made the carriage 28 is raised by lifting upwardly thereon to remove the mandrels from the channels of the tile. The tile is then removed from the plate 49 and another tile removed from the press is placed thereon in a similar manner to continue the operation of the machine.

From the foregoing it is obvious that I have provided a perforating machine by which the drain openings may be cut with a single operation of the actuating lever 118, and that due to the backing arrangement of the mandrels and the knife-like action of the cutters, the drain apertures are cleanly formed.

What I claim and desire to secure by Letters Patent is:

1. A machine of the character described including a truck, tile supporting means on the truck, a mandrel reciprocably carried on the truck and movable into a tile carried by the tile supporting means, a carriage movable on the truck to and from the tile supporting means, means for actuating the carriage, means on the carriage for perforating a tile carried by said supporting means, and means on the truck for raising and lowering the mandrel.

2. A machine of the character described including tile supporting means, a mandrel reciprocably movable into a tile carried by the tile supporting means, a carriage movable to and from the tile supporting means, means for actuating the carriage, means on the carriage for perforating a tile carried by said supporting means, and means for raising and lowering the mandrel.

3. A machine of the character described including a supporting means, a cutter carrying frame reciprocable on the supporting means, tubular cutters on said frame, means mounting a work piece on the supporting means for engagement by the tubular cutters, means for reciprocating the frame to project the tubular cutters through the work piece, and means carried on the supporting means for removing material from the cutters incidental to movement of the frame away from the work piece.

4. A machine of the character described including a supporting means, a cutter carrying frame reciprocable on the supporting means, means for mounting a tile on the supporting means, cutters on said frame, a rack connected with said frame, a pinion meshing with the rack, a lever connected with the pinion for actuating the rack to project the cutters into cutting contact with a tile carried on said mounting means, and means for displacing material from the cutters incidental to retractive movement of the frame upon actuation of the lever in reverse direction.

5. A machine of the character described including a support, a plate member carried by the support and having bearing openings, a carriage movable relative to the plate member including sleeve members mounted in said bearing openings, plates connected with the ends of the sleeve members on the respective sides of the plate member, a rack connected with one of the plates, cutters mounted on the other of said plates, a pinion meshing with the rack, and means for actuating the pinion to reciprocate the carriage.

6. A machine of the character described including a support, a plate member carried by the support and having bearing openings, a carriage movable relative to the plate member including sleeve members mounted in said bearing openings, plates connected with the ends of the sleeve members on the respective sides of the plate member, a rack connected with one of the plates, cutters mounted on the other of said plates, a pinion meshing with the rack, means for actuating the pinion to reciprocate the carriage, and lubricating means on the carriage to lubricate the cutters.

7. A machine of the character described including a support, a mandrel for mounting a tile on the support, a cutter carrying frame reciprocable on the support, plungers carried on the support in spaced relation with the mandrel, tubular cutters on said frame and movable axially over the plungers into cutting relation with the tile and retractively away from the tile and over the plungers after the cutters have disengaged from the tile to effect displacement of the material cut from the tile and carried out of the tile by the cutters, and means for actuating the cutter carrying frame.

8. A machine of the character described including a support, a mandrel for mounting a tile on the support, a cutter carrying frame reciprocable on the support, plungers carried on the support in spaced relation with the mandrel, tubular cutters on said frame and movable axially over the plungers into cutting relation with the tile and retractively away from the tile and over the plungers after the cutters have disengaged from the tile to effect displacement of the material cut from the tile and carried out of the tile by the cutters, means for actuating the cutter carrying frame, and lubricating means on the cutter carrying frame for applying a lubricant to the cutters.

9. A machine of the character described including a supporting means, a mandrel on the supporting means for mounting a tile, a plunger carrying member fixed on the supporting means, a cutter carrying frame including a pair of plates, spacing members connecting the plates and having sliding support on the plunger carrying member, tubular cutters carried by one of the plates and movable axially over the plungers, an actuating bar connected with the cutter carrying frame, means slidably mounting the bar on the supporting means, and means for reciprocating the bar to move the cutters into cutting relation with a tile supported by said mandrel.

10. A machine of the character described including a supporting means, a mandrel on the supporting means for mounting a tile, a plunger carrying member fixed on the supporting means, a cutter carrying frame including a pair of plates, spacing members connecting the plates and having sliding support on the plunger carrying member, tubular cutters carried by one of the plates and movable axially over the plungers, an actuating bar connected with the cutter carrying frame, means slidably mounting the bar on the supporting means, means for reciprocating the bar to move the cutters into cutting relation with a tile supported by said mandrel, a lubricant containing reservoir on the cutter carrying frame, and a nozzle supported over each cutter and having connections with said reservoir for supplying lubricant to said cutters.

11. In a machine of the character described, a supporting means, vertical guides on the supporting means, a carriage slidably supported on the guides, a mandrel depending from the carriage, counterbalance means connected with the carriage for effecting raising and lowering of the mandrel from and into engagement with a tile, a cutter carrying frame reciprocably carried on the supporting means, a plunger carrying frame on the supporting means, plungers on said plunger carrying frame, tubular cutters on the cutter carrying frame and movable axially over the plungers into cutting relation with the tile, and means for reciprocating the cutter carrying frame.

12. In a machine of the character described, a supporting means, vertical guides on the supporting means, a carriage slidably supported on the guides, a mandrel depending from the carriage, counterbalance means connected with the carriage for effecting raising and lowering of the mandrel from and into engagement with a tile, a cutter carrying frame reciprocably carried on the supporting means, a plunger carrying frame on the supporting means, plungers on said plunger carrying frame, tubular cutters on the cutter carrying frame and movable axially over the plungers into cutting relation with the tile, a rack bar connected with the cutter carrying frame, means reciprocably mounting the rack bar on the supporting means, a pinion rotatably mounted on the supporting means and engaging the rack bar, and means for oscillating the pinion to reciprocate the rack bar for effecting movement of the cutters into cutting relation with the tile.

RAYMOND R. DAUWALTER.